United States Patent [19]

Adams

[11] Patent Number: 5,131,848

[45] Date of Patent: Jul. 21, 1992

[54] TESTING METHOD AND APPARATUS

[75] Inventor: Warren K. Adams, Endwell, N.Y.

[73] Assignee: Doron Precision Systems, Inc., Binghamton, N.Y.

[21] Appl. No.: 584,920

[22] Filed: Sep. 19, 1990

Related U.S. Application Data

[63] Continuation of Ser. No. 334,483, Apr. 7, 1989, abandoned.

[51] Int. Cl.$^5$ .................................................. G09B 9/04
[52] U.S. Cl. ........................................ 434/69; 434/64; 434/65; 273/7
[58] Field of Search ............... 434/258, 69, 29, 62, 434/64, 65, 15, 14, 38; 446/7; 364/410; 273/85 G, 86 R, 311, 312, 313

[56] References Cited

U.S. PATENT DOCUMENTS

| | | | |
|---|---|---|---|
| 2,630,171 | 3/1953 | Allgaier | 434/64 X |
| 2,979,831 | 4/1961 | Bullock | 434/64 |
| 3,108,384 | 10/1963 | Jazbutis et al. | 434/65 |
| 3,488,861 | 1/1970 | Jones et al. | 434/69 |
| 3,523,374 | 8/1970 | Schuster | 434/69 |
| 3,537,191 | 11/1970 | Kazuo Aso | 434/65 |
| 3,591,931 | 7/1971 | Schuster | 434/69 |
| 3,594,921 | 7/1971 | Quicker, Jr. | 434/64 |
| 3,898,746 | 8/1975 | Seidle | 434/69 |
| 4,053,740 | 10/1977 | Rosenthal | 273/313 X |
| 4,077,138 | 3/1978 | Foerst | 434/69 |
| 4,145,043 | 3/1979 | Olliges | 273/313 X |
| 4,182,053 | 1/1980 | Allen et al. | 434/69 |
| 4,342,556 | 9/1982 | Hasse | 273/312 X |
| 4,383,827 | 5/1983 | Foerst | 364/578 X |
| 4,481,000 | 11/1984 | Mohon | 273/313 X |

FOREIGN PATENT DOCUMENTS 8806776  9/1988  Int'l Pat. Institute ............... 272/73

OTHER PUBLICATIONS

Aviation Week & Space Technology, Aug. 17, 1970, pp. 40-44.

Primary Examiner—Robert Bahr
Assistant Examiner—J. B. Doyle
Attorney, Agent, or Firm—Richard G. Stephens

[57] ABSTRACT

A testing method and apparatus for determining the reaction time of machine operators, especially drivers of automotive vehicles. A series of images are projected onto a viewing screen to be observed by a student at a student station. The images comprise one or more visual depictions of various operating conditions, including non-threatening and threatening conditions. After presenting a sequence of non-threatening conditions images, an "action cue image" representing a threatening condition is projected. The elapsed time between the projection of the action cue image and the initiation of the required response of the student is measured to derive the student's reaction time, in terms of seconds or distance traveled at a specified speed.

6 Claims, 3 Drawing Sheets

TESTING METHOD AND APPARATUS

This application is a continuation of my co-pending application Ser. No. 334,483 filed Apr. 7, 1989, now abandoned.

BACKGROUND OF THE INVENTION

1. Field of the Invention

This invention relates to a testing method and apparatus, and more particularly to a method and apparatus for testing the reaction times of machine operators, when they are subjected to various cues. The invention is believed to have particular utility in connection with the training and testing of motor vehicle operators.

2. Description of the Prior Art

Measurement of reaction time of motor vehicle drivers is well known in the prior art, but prior training systems have used lights of different colors, for example, to provide cues to the training student as to what procedure he must next perform. One or more arrays of colored lights may be used to convey commands. For example, illumination of one or more red lights on the trainer dashboard may convey the command "Stop"; one or more yellow lights may convey the command "Proceed with caution", and a set of green lights may indicate "Proceed at normal speed". The amount of time intervening between the presentation of a cue and the commencement of the required action on the part of the student is measured, stored and later displayed to indicate the reaction time of the student.

Such arrangements however, are rather unrealistic. In the real world changing traffic conditions ahead of a moving vehicle are not communicated to the driver by systems of colored lights, but instead by a flow of constantly-changing visual information, which includes incidents where a threatening situation may suddenly develop after a number of innocuous or non-threatening traffic conditions have occurred. Another factor not heretofore considered in the prior art is the change in reaction time when the number of visual inputs is increased. It is certainly easier and quicker for a driver to recognize a developing threatening situation where only one or a few objects are in view, compared to the situation where visual images of a large plurality of objects are seen, and the number and location of the objects are changing randomly and relatively quickly.

OBJECTS OF THE INVENTION

Accordingly, a principal object of the present invention is to provide an improved testing method and apparatus for testing the reaction times of machine operators when they are subjected to various cues.

Another object of the present invention is to provide an improved driver training system for testing the reaction times of student drivers of automobiles or other motor vehicles.

Still another object of the present invention is to provide an improved driver training system in which one or more non- threatening or innocuous situations are sequentially presented to a student driver, followed by one or more threatening situations requiring the student to take some specific and prompt remedial action.

A further object of the present invention is to provide an improved driver training system of the type described in which the number of innocuous situations presented to the student may be altered randomly.

Yet another object of the present invention is to provide an improved driver training system of the type described in which the number of threatening situations presented to the student may be altered randomly.

Still another object of the present invention is to provide an improved driver training system of the type described in which the location of images representing innocuous or threatening situations may be randomly changed in the views presented to the student.

A further object of the present invention is to provide an improved testing method for determining the reaction time of machine operators in which one or more threatening situations are presented to a student operator, following the presentation of one or more innocuous situations, and measuring the time required for the student to take a predetermined action following the presentation of the threatening situation(s).

SUMMARY OF THE INVENTION

To attain these and other objects of the invention, there is provided an operator training system in which a relatively large screen is provided to display projected images to one or more student operators, each seated before a simulated machine operating position equipped with the controls usually found in the vehicle to be simulated, such as a steering wheel, a brake pedal and an accelerator pedal. A full frame field, of green background, is projected onto a screen of eight to twelve feet in width, for example, and although not visibly delineated, the field may be thought of as comprising a plurality of portions or sectors of equal size. One or more on-screen images are projected onto these portions or sectors. The images are projected to randomly selected sectors, in random series or sequences, persisting for predetermined time intervals and separated by predetermined time intervals. The term "random" is used to describe the change in the number and locations of images as they appear from the student operator's perspective. The actual locations, number, and time intervals of particular images on the screen are predetermined, of course, by use of a given film strip, in order to achieve desired testing objectives. The images fall into two major categories: first, an innocuous image or images, representing a non-threatening situation, such images sometimes being referred to herein as inert symbols, and second, images representing a threatening situation, hereinafter known as "action cues". The inert symbols and action cues can collectively be referred to conveniently as "icon images", with this term meaning only individual vehicle icon images displayed solely in combination with one another. These images can be distinguished from prior art CRT icon images, such as those used by U.S. Pat. No. 4,383,827 (Foerst). Unlike the present invention, the Foerst patent uses icon images representing pictorial settings (e.g., roadways, trees, signs, etc.). It is important to note that in order to achieve specific testing objectives this invention intentionally does not use this type of "pictorial" representation, but instead projects its images on a substantially plain background.

In operation, after an orientation or familiarization session, a test session is conducted. One or more inert symbols are projected in sequence to randomly located sectors for predetermined time intervals. At the end of the sequence of inert symbols, an action cue is presented at a randomly selected location, for a predetermined time interval.

For each of the various symbols, a particular response is required on the part of the student or operator. While one or more inert symbols are displayed, for example, the student or operator should have the accelerator pedal depressed and the steering wheel in its neutral or "straight ahead" position since no threatening or potentially dangerous situation is present. However, when an action cue is suddenly presented, with or without the presence of one or more inert symbols, an immediate reaction is demanded of the student or operator, depending upon the message conveyed by the action cue image. For example, an action cue image may represent an automobile coming head-on, and thus require the student to immediately release the accelerator pedal and depress the brake pedal. Other action cue images can require evasive actions of various types, depending upon the particular cue conveyed by the image.

When an action cue image is presented, the time interval between the presentation of the image and the initiation of the required response is measured by the system, and the results can be presented either in terms of seconds of reaction time, or for a given speed, in distance traveled in terms of feet.

The "distance traveled" number is displayed for each operator at the driver station and may be recorded on a master printed record of all driver scores. The shorter the distance traveled, the shorter will have been the time required to respond to an action cue.

BRIEF DESCRIPTION OF THE DRAWINGS

In the drawings.

Similar reference characters refer to similar parts in each of the several views.

DETAILED DESCRIPTION

Figure 1:
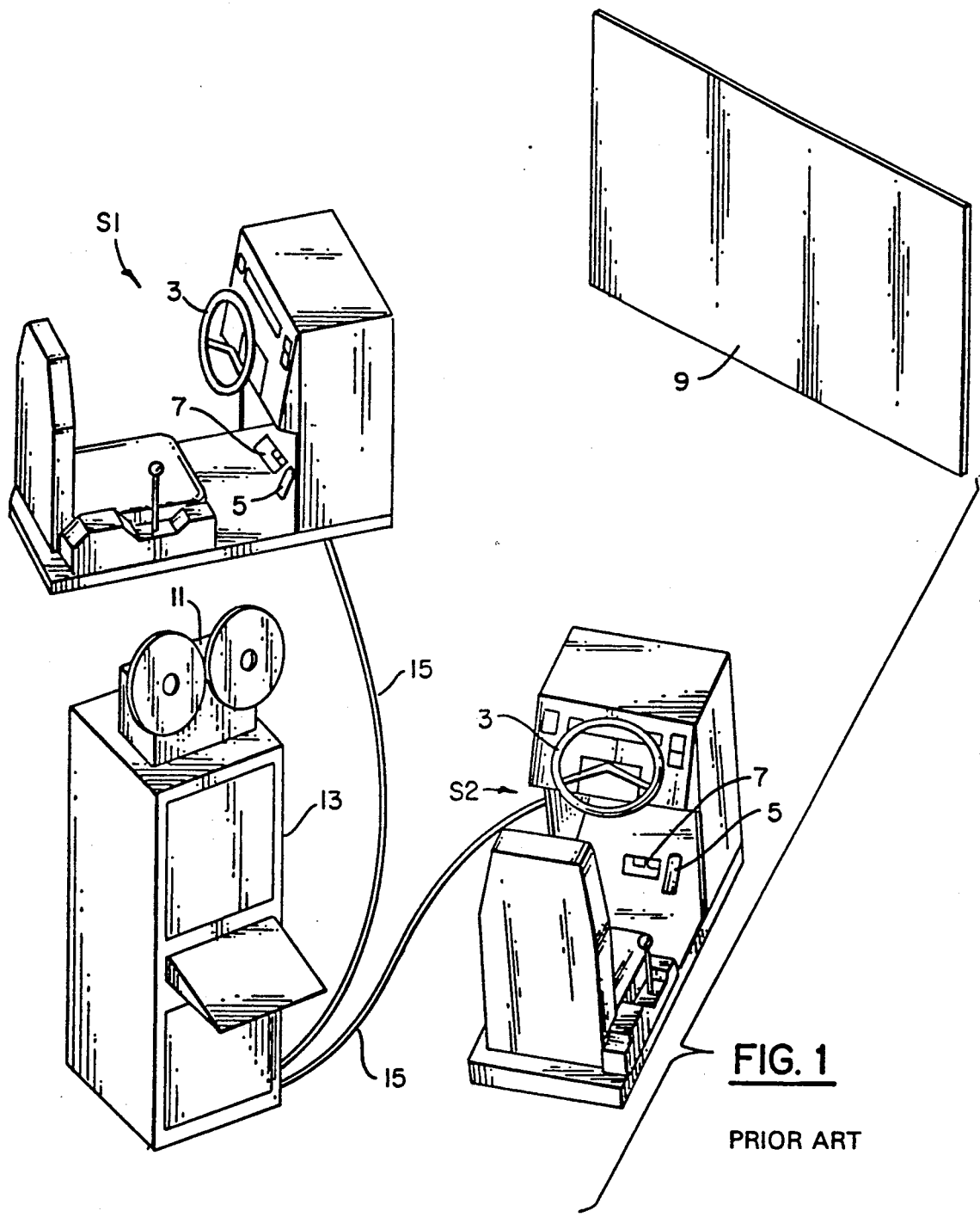
FIG. 1 is an overall diagrammatic view of a driver training system of the type with which the present invention can be utilized.

FIG. 1. diagrammatically shows one exemplary form of apparatus useful for practicing the present invention. Two student stations are shown, S1 and S2, each of which comprises a simulated automotive driver station, including automotive controls such as a steering wheel 3, an accelerator pedal 5 and a brake pedal 7. Within full view of each student is a viewing screen 9. Various images are projected onto the viewing screen by a projector 11 of conventional type. The projector may be mounted on an instructor's console 13, which also incorporates an analyzer system of the type well known in the art and exemplified by driver analyzer systems sold by DORON PRECISION SYSTEMS, INC., Binghamton, N.Y. The instructor's console and analyzer 13 are connected by suitable cables 15, 15 which carry electrical signals between console 13 and the student stations S1 and S2.

Figure 2:
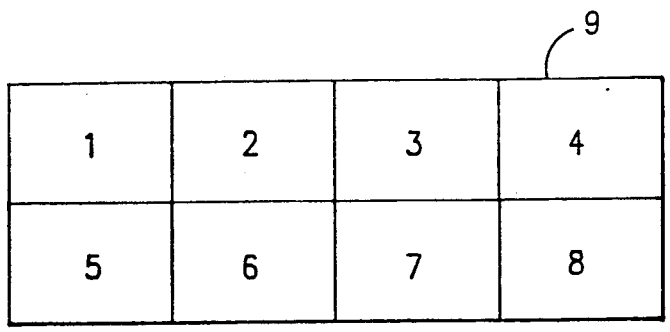
FIG. 2 is a diagrammatic view of one form of screen layout which may be provided for this invention.

FIG. 2 shows the manner in which the viewing screen may be arbitrarily divided into eight sectors. Although not visibly delineated, the total field is to be thought of as having a plurality of sectors of equal size as shown. For identification purposes, the sectors may be identified by numbers 1 to 8.

The images which are projected onto the screen 9 by the projector 11 may take a number of different forms, but are divided into two categories. First, there is an image, or set of images, which convey to the student or operator of the system a message of a non-threatening situation. For example, in the case of a driver training system the image may be that of a highway vehicle moving away from the student or operator, by illustrating, in diagrammatic form, the view of the rear end of an automobile. Second, there is an image, or set of images, which convey to the student or operator of the system a message of a threatening situation, or potentially dangerous situation. In the case of a driver training system the image may be that of a vehicle coming at or toward the student head-on, or converging with the course of the student, either from the left or from the right.

Figure 3:
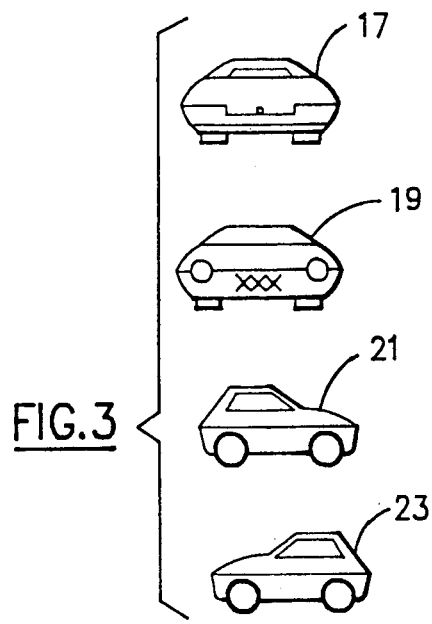
FIG. 3 illustrates various exemplary types of images which may be projected onto the viewing screen of the invention.

In FIG. 3 reference character 17 illustrates an innocuous or non-threatening image representing an automobile ahead of the student which may be moving away from the student. Image 19 illustrates a threatening situation, in which an automobile is moving head-on toward the student. Image 21 represents a threatening situation in which an automobile is either crossing or converging with the student's path from left to right, and image 23 represents a threatening situation in which the threatening vehicle is either crossing or converging with the student's path, moving from right to left.

Each of the four different images of FIG. 3 requires a different response from the student. For the innocuous or inert symbol the student is required to maintain speed and direction by keeping the steering wheel straight and the accelerator pedal depressed. For the first action cue image 19, the student is required to release the accelerator pedal and apply the brake pedal. For action cue images 21 and 23, the student is required to release the accelerator pedal and steer either right or left. Various combinations of inert symbols and action cue images are presented in sequence by projection onto the viewing screen, and the reaction time of the student is measured to determine whether and how quickly the student can correctly respond to the sudden appearance of a threatening cue. Various combinations and sequences of images are shown in FIGS. 4 through 20, showing what the student will see on the viewing screen during various typical training sequences.

Figure 4:
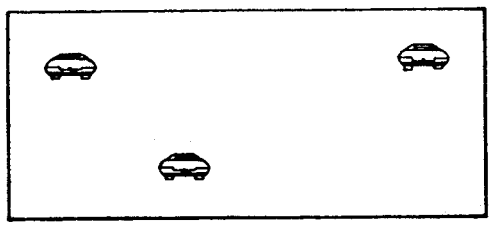
FIGS. 4, 5 and 6 are views showing a sequence of three typical placements of three inert symbols.
Figure 5:
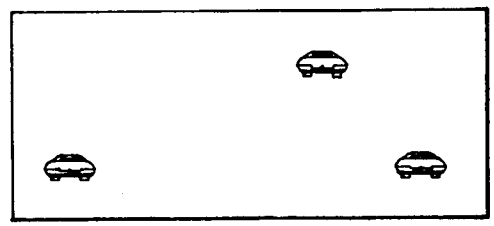
Figure 6:
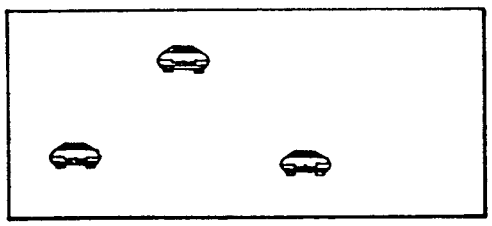

FIGS. 4, 5 and 6 show three different placements of three inert symbols. The on-screen locations of the images in FIG. 4 are sectors 1, 4, and 6. After a predetermined time interval, for example, two seconds, a second group of inert symbols is presented, as shown in FIG. 5, in screen sectors 3, 5 and 8. Again following a predetermined interval, still another group of three inert symbols is presented to the student, as shown in FIG. 6, with the screen location being sectors 2, 5, and 7.

Figure 7:
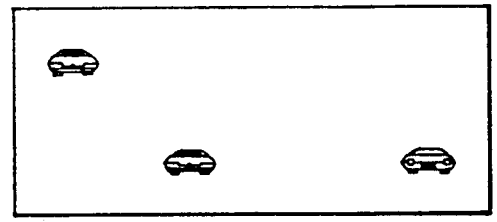
FIG. 7 is a diagrammatic view showing one of the inert symbols replaced by an action cue image.
Figure 8:
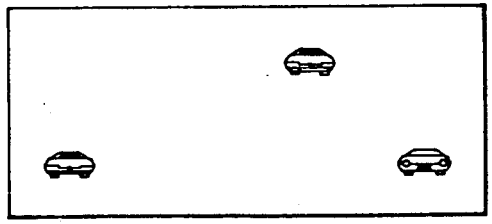
FIG. 8 is a diagrammatic view showing the action cue image remaining in place, but with the inert symbols shifted in location.

After still another time interval, an action cue image is presented at screen location 8, while inert symbols are presented at screen locations 1 and 6, as shown in FIG. 7. This first display of an action cue is maintained for a predetermined time interval, for example 2 seconds, following which, as shown in FIG. 8, placement of the action cue image does not change, but the placement of the inert symbols does. This display is maintained for a suitable predetermined time interval, for example, 5 seconds, during which time scores can be computed and displayed at student stations as well as at the instructor's console. Such scores can be printed out in known fashion to provide a permanent record of each student's performance.

Figure 9:
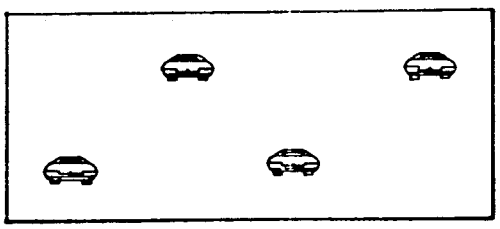
FIGS. 9, 10, and 11 are diagrammatic views showing a sequence of three different placements of four inert symbols.
Figure 10:
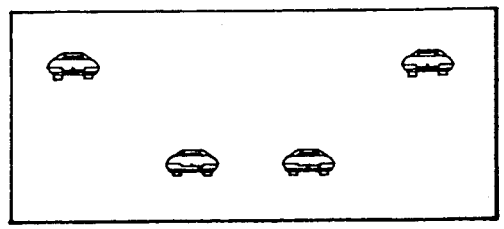
Figure 11:
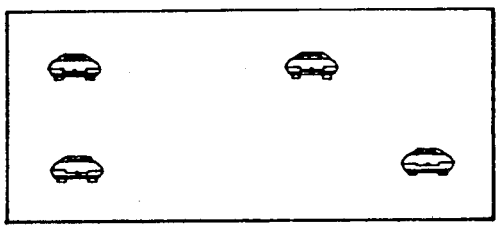

FIGS. 9, 10 and 11 show the use of four inert symbols, in a sequence of three different placements with no action cue images. The on-screen location of inert symbols in FIG. 9 are sectors 2, 4, 5 and 7; for FIG. 10 they appear in sectors 1, 4, 6 and 7; and the symbols in FIG. 11 are in sectors 1, 3, 5 and 8.

Figure 12:
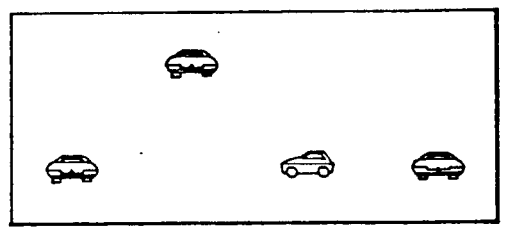
FIGS. 12 and 13 are diagrammatic views showing another type of action cue image in a sequence of two different placements of three inert symbols.
Figure 13:
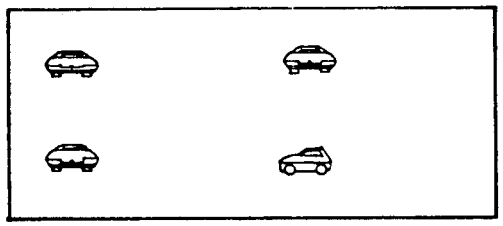

FIGS. 12 and 13 show the use of three inert symbols and one action cue image (image 23, FIG. 3) with the action cue image located in screen sector 7 in both figures, but with the inert symbols moving from screen sectors 2, 5, and 8 in FIG. 12, to sectors 1, 3, and 5 in FIG. 13.

Figure 14:
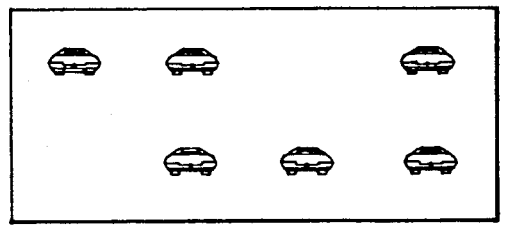
FIGS. 14, 15 and 16 are diagrammatic views showing a sequence of three different placements of six inert symbols.
Figure 15:
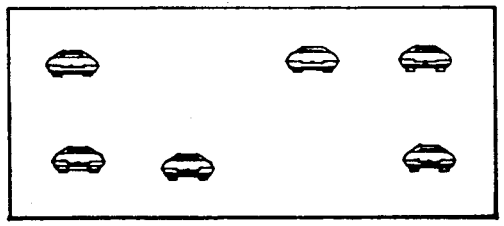
Figure 16:
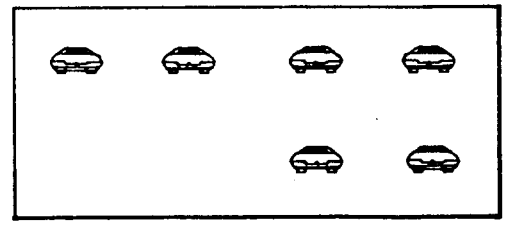

FIGS. 14, 15 and 16 show the use of six inert symbols in three different placements, with no action cue images. The screen location of symbols in FIG. 14 is sectors 1, 2, 4, 6, 7, and 8; in FIG. 15 they are located in sectors 1, 3, 4, 5, 6, and 8; in FIG. 16 they appear in sectors 1, 2, 3, 4, 7, and 8.

Figure 17:
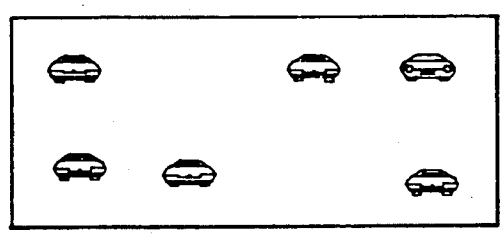
FIGS. 17 and 18 are diagrammatic views showing an action cue image in a sequence of two placements of five inert symbols.
Figure 18:
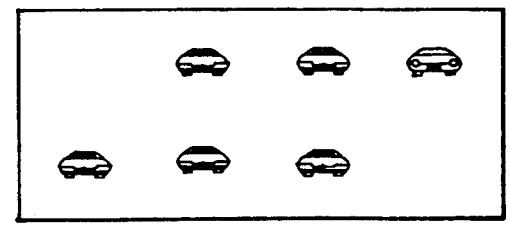

FIGS. 17 and 18 show the use of five inert symbols in changing positions with an action cue image (image 19, FIG. 3) which does not change placement in the sequence, remaining in screen sector 4. The inert symbols in FIG. 17 are placed in screen sectors 1, 3, 5, 6, and 8 while in FIG. 18 they appear in sectors 2, 3, 5, 6, and 7.

A number of different objectives can be attained by use of systems embodying the present invention. The system can provide a measure of student's ability to quickly recognize critical cues as related to (a) the number of inert images presented simultaneously with an action cue image (Input Overload), (b) the location of such cues within a standardized field of view (Visual Field Deficiency), (c) the degree of their dissimilarity from inert images (Detail Discrimination), and (d), the more complex task of multiple response; i.e., recognition of cue presence, determination of response required, and execution of the correct evasive action (Evasive Action Proficiency).

From all of the foregoing it will be apparent that my invention provides an improved testing method and apparatus for determining the reaction time of a student or operator of a machine or system for example, an automotive vehicle, to a suddenly developing situation which represents a potentially dangerous situation, by displaying a series of innocuous images on a display screen to be viewed by the student, followed by the display of an action cue image which not only warns the student of a threatening situation but which also requires a specific evasive action to be initiated by the student. The reaction time of the student is measured by the time interval between the first appearance of an action cue image and the time at which the student initiates the required response.

Although I have herein shown and described only one preferred embodiment of testing method and apparatus embodying my invention, it will be apparent to those skilled in the art that various changes and modifications may be made therein, within the scope of the appended claims, without departing from the spirit and scope of the invention.

Having thus described my invention, what I claim is:

1. An operator testing system, comprising, in combination: an operator station equipped with a plurality of controls; a viewing screen presenting a substantially plain background viewing surface and located to be viewed from the operator station; projector means for projecting a series of sets of icon images onto said viewing screen so that said images remain motionless within predetermined areas of said screen for predetermined periods of time; and means for measuring the time delays between the projections of selected ones of said sets of icon images and operations by an operator of predetermined ones of said controls.

2. The system of claim 1 which includes means for recording said time delays.

3. The method of testing an operator which comprises the steps of: cinematically projecting a plurality of sets of vehicle icon images successively onto an otherwise substantially plain background surface for observation by said operator with said projected images remaining motionless within predetermined areas of said background surface for predetermined periods of time; and measuring the time delays between the projections of selected ones of said sets of icon images and operations by said operator of controls available to said operator.

4. The method of claim 3 wherein said step of projecting comprises projecting each of said icon images in each set onto a respective portion of a finite group of predetermined different area portions of said background surface.

5. The method of claim 3 wherein the number of icon images varies in various of said successively projected sets.

6. The method of claim 3 which includes the step of recording said time delays.

* * * * *